US005079058A

United States Patent [19]

Tomiyama et al.

[11] Patent Number: 5,079,058

[45] Date of Patent: Jan. 7, 1992

[54] PATTERNED FILM FORMING LAMINATED SHEET

[75] Inventors: Takeshi Tomiyama; Masahiro Endo; Sadaaki Hashimoto; Kenji Maeda, all of Hiratsuka, Japan

[73] Assignee: Kansai Paint Co., Ltd., Hyogo, Japan

[21] Appl. No.: 487,263

[22] Filed: Mar. 2, 1990

[30] Foreign Application Priority Data

Mar. 3, 1989 [JP] Japan ........ 1-51070
May 11, 1989 [JP] Japan ........ 1-117882

[51] Int. Cl.[5] ........ B32B 7/12

[52] U.S. Cl. ........ 428/40; 428/354; 428/900; 428/206; 428/328; 428/208; 428/343; 427/128; 427/130

[58] Field of Search ........ 428/900, 343, 692, 40, 428/208, 206, 354, 352; 427/128, 130

[56] References Cited

U.S. PATENT DOCUMENTS 3,497,411 2/1970 Chebiniak ........ 428/900 X
4,098,935 7/1978 Knudsen ........ 428/900 X
4,125,653 11/1978 Muzik ........ 428/900 X
4,857,372 8/1989 Ginkel et al. ........ 428/42

FOREIGN PATENT DOCUMENTS

175670/88 of 1988 Japan .

*Primary Examiner*—George F. Lesmes
*Assistant Examiner*—D. R. Zirker
*Attorney, Agent, or Firm*—Fisher, Christen & Sabol

[57] ABSTRACT

Disclosed is a patterned film forming laminated sheet comprising a multi-layer construction prepared by successively laminating a release sheet layer (1), a pressure-sensitive adhesive layer (2), a base sheet layer (3), and a patterned film layer (4) or further laminating a pigmented print layer (5), said patterned film layer (4) being prepared by a process which comprises coating a fluid coating composition containing a powdery magnetic material on one side of the base sheet layer (3) to form a fluid film, and acting a magnetic force on the powdery magnetic material contained in the fluid film in a fluid state to form a pattern.

8 Claims, 1 Drawing Sheet

PATTERNED FILM FORMING LAMINATED SHEET

BACKGROUND OF THE INVENTION (1) Field of the Invention

The present invention relates to a patterned film forming laminated sheet which is capable of forming a patterned film on an object simply by means of sticking.

(2) Description of the Prior Art:

Japanese Patent Application Laid-Open No. 175670/88 discloses a process for forming a patterned film, which process comprises coating a coating composition, in which a powdery magnetic material is dispersed, on a surface of an object such as plastic plate, aluminum plate or the like to form a film, and fixing or placing closely in position a magnet cut or molded in the form of letters, marks, patterns, etc. on the back side of the object (or the surface of the coated film) to orientate the powdery magnetic material by the magnetic action of the magnet for forming a magnetic pattern on the coated film, said pattern as a whole forming the shape of intended letters, marks and patterns.

The above prior art process has such an advantage that the patterned film has a smooth surface without forming roughness and is unlikely to be stained, but has such a disadvantage that it is often difficult or impossible to act a magnetic force on the aforementioned fluid film depending on the shape, structure and material of the object, resulting in that its applications are extremely limited.

Moreover, it is essential for the above prior art process to provide beforehand a magnet having the same shape as those of the intended letters, marks and patterns in order to form the above shape, resulting in increasing the product cost and in reducing productivity.

SUMMARY OF THE INVENTION

It is an object of the present invention to provide a patterned film forming laminated sheet which is capable of forming a patterned film on an object simply by means of sticking.

It is another object of the present invention to provide a patterned film forming laminated sheet which is capable of showing changes in the magnetic pattern due to the angle of incidence, colorful feelings due to control of lighting and perspective feelings or stereographic feelings.

It is still another object of the present invention to provide a patterned film forming laminated sheet which is capable of acting a magnetic force on the aforementioned fluid film regardless of the shape, structure and material of the object, resulting in wide applications.

A feature of the present invention consists in forming a patterned film under specified conditions on one side of a base sheet and an adhesive layer on the other side of the base sheet to be widely applicable to the object, that is, in forming a multi-layer construction prepared by successively laminating a release sheet layer (1), a pressure-sensitive adhesive layer (2), a base sheet layer (3), and a patterned film layer (4) or further laminating a pigmented print layer (5).

Firstly, the present invention provides a patterned film forming laminated sheet comprising a multi-layer construction prepared by successively laminating a release sheet layer (1), a pressure-sensitive adhesive layer (2), a base sheet layer (3), and a patterned film layer (4), said patterned film layer (4) being prepared by a process which comprises coating a fluid coating composition containing a powdery magnetic material on one side of the base sheet layer (3) to form a fluid film, and acting a magnetic force on the powdery magnetic material contained in the fluid film in a fluid state to form a pattern.

Secondly, the present invention provides a patterned film forming laminated sheet comprising a multi-layer construction prepared by successively laminating a release sheet layer (1), a pressure-sensitive adhesive layer (2), a base sheet layer (3), a patterned film layer (4) and a pigmented print layer (5), said patterned film layer (4) being prepared by a process which comprises coating a fluid coating composition containing a powdery magnetic material on one side of the base sheet layer (3) to form a fluid film, and acting a magnetic force on the powdery magnetic material contained in the fluid film in a fluid state to form a pattern.

BRIEF DESCRIPTION OF THE DRAWINGS

The invention is further explained with reference to the drawings wherein.

Figure 1:
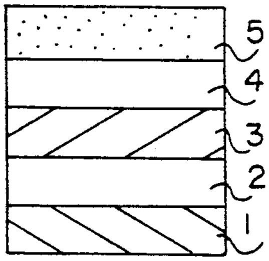
FIG. 1 through FIG. 10 are schematic cross-sections of patterned laminated sheets of the present invention.
Figure 2:
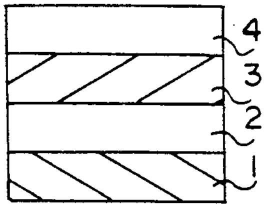

DETAILED DESCRIPTION OF THE INVENTION:

Respective layers (1)–(5) constituting the patterned film forming laminated sheet of the present invention are explained as follows.

Release Sheet Layer (1):

The release sheet layer (1) is laminated on one side of the pressure-sensitive adhesive layer (2) laminated to prevent the adhesive layer (2) from adhering to others during storage or transportation of the laminated sheet of the present invention, is easily releasable from the adhesive layer (2) and is released beforehand to be used. The known release sheet may be used as the release sheet layer (1). Examples thereof include papers or films coated or immersed with a release agent such as silicone, wax or fluorocarbon resin; films of synthetic resins having releasability, for example, polypropylene, polyethylene and the like; and the like.

Pressure-sensitive Adhesive Layer (2):

The pressure-sensitive adhesive layer (2) is arranged between the release sheet layer (1) and the base sheet layer (3) to make it possible for the base sheet layer (3) with the patterned film formed thereon to be applied and sticked onto the surface of the object. Specifically, the permanent adhesives, which are known per se, may be used as the adhesive layer (2). Examples thereof include adhesives such as natural rubber, styrene-butadiene rubber, polyisobutylene, acrylic resin, polyvinyl ether, polyvinyl isobutyl ether and the like, preferably an acrylic resin having a glass transition temperature of $-10°$ to $-60°$ C., for example, polybutylacrylate, poly-2-ethylhexyl acrylate and the like. Further, a tackifier such as rosin, rosin ester, coumarone resin, terpene resin, hydrocarbon resin, oil-soluble phenol resin or the like, and a softening agent such as fatty ester, fats and oils of animals and plants, wax, petroleum heavy fractions and the like may be optionally used along with the above adhesive depending on the compatibility with the adhesive as the major component. In addition, additives, pigments, age resisters, stabilizers and the like may also be incorporated as an additive.

The pressure-sensitive adhesive layer (2) may be formed by a process which comprises dissolving or dispersing the adhesive as the essential component in an organic solvent to be coated on one side of the base sheet layer (3) with a knife coater, roll coater, screen printing or gravure coater, and evaporating volatile matters such as the organic solvent and the like. The adhesive layer (2) has a thickness of 1-500 μm, preferably 20-40 μm. The adhesive and the like may be melted without using the organic solvent to be coated.

When an environmental temperature during the lamination of the patterned film forming laminated sheet of the present invention is low, it is preferred to prepare an adhesive layer (2) having a low glass transition temperature.

It is necessary for the adhesive layer (2) to be formed on one side of the base sheet layer (3) and on the side opposite to the patterned film layer (4).

Base Sheet Layer (3):

The base sheet layer (3) is formed between the adhesive layer (2) and the patterned film layer (4) to reinforce the physical properties of the patterned film layer (4) and to support the patterned film layer (4), and preferably has good low-temperature characteristics, heat resistance, shrink-resistance, flexibility, weather resistance, chemical resistance, and the like. Preferable examples thereof include plastics such as polyurethane, polyimide, nylon, polyethylene, polyester, polycarbonate, plasticized polyvinyl chloride and the like, and metals such as iron, stainless steel, aluminum and the like.

The base sheet layer (3) has a thickness of 1-1000 μm, preferably 30-120 μm, and may be transparent or opaque. Those which are capable of being easily cut to an intended shape or size are preferred.

Figure 4:
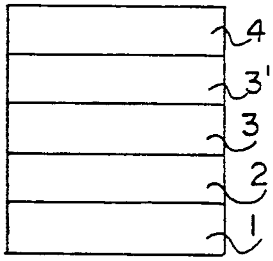

In the case where the adhesion properties between the patterned film layer (4) and the base sheet layer (3) are poor, a primer layer (3') is preferably formed between the above two layers as required (see, FIG. 4).

Primer Layer (3'):

The primer layer (3') is formed between the patterned film layer (4) and the base sheet layer (3), and has a function to improve the adhesion properties between the above two layers. Specific examples thereof include cellulose and derivatives thereof, polyester resin, acrylic resin, rubber based resin, styrene-butadiene copolymer, and the like. They are preferably dissolved or dispersed in an organic solvent and/or water to be coated on the surface of the base sheet layer (3) where the patterned film is formed. The primer layer (3') has a thickness of preferably 1-50 μm after drying. The composition of the primer layer (3') may exemplify the above ones, which may optionally be selected depending on the compositions of the patterned film layer (4) and the base sheet layer (3). The organic solvent to be used is not specifically limited, but it is preferred to include ones to make the base sheet layer (3) swell. Examples thereof include mixed solvents comprising hexaphloromethaxylene, 1,1,3-phlorotrichloroethane, butyl acetate and 3-methoxybutyl acetate.

Figure 6:
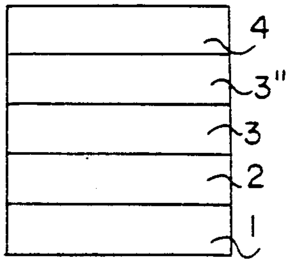
Figure 8:
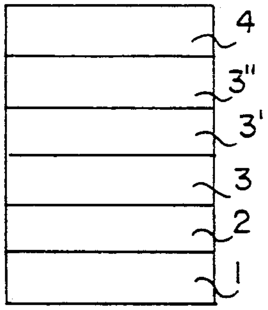

Pigmented Film Layer (3''):

The pigmented film layer (3'') is formed between the patterned film layer (4) and the base sheet layer (3)(see, FIG. 6), or between the patterned film layer (4) and the primer layer (3') (see, FIG. 8) when needed. The pigmented film layer (3'') contains a colored pigment and a vehicle component as the major components and contains no magnetic material.

The pigmented film layer (3'') is formed to make a pattern to be developed an intended color tone. Therefore, for example, in the case where the base sheet per se is pigmented as of a plastics, and its color tone is satisfactory, there is no need of forming the pigmented film layer (3'').

The color tone of the pigmented film layer (3'') may be arbitrarily selected as intended, and may easily be controlled by controlling the compositions and proportions of a colored pigment of an organic, inorganic or metallic type. The vehicle component is preferably at least one selected from ones used in the patterned film layer (4) as explained hereinbelow.

The pigmented film layer (3'') has a thickness of 10-30 μm, preferably 15-25 μm.

Patterned Film Layer (4):

The patterned film layer (4) is formed on one side of the base sheet layer (3), and is a film in which a pattern is formed by an action of the magnetic force.

The patterned film layer (4) is formed by use of a fluid coating composition containing, as the major components, a powdery magnetic material, vehicle component and solvent, and further containing, when needed, a colored pigment, dye, aluminum powder, pearl-shaped pigment, mica and the like.

The powdery magnetic material is a powder, an orientation of which is changed by a magnetic force due to the action of a magnet thereon, and, for example, preferably includes the powder of nickel, stainless steel having a high content of iron, iron, cobalt or the like, and ones coated with or containing the above metals. The powdery magnetic material may have a shape of flake, thin sheet, granule or the like, and desirably have a size of 1-150 μm, preferably 10-30 μm in the longitudinal direction or in diameter.

The vehicle component to be used may include resins for use in the conventional coating composition, for example, resins which are dried or reacted for curing at normal temperatures, resins which are cured or melted by heating. Preferable examples thereof include alkyd resin, polyester resin, acrylic resin, urethane resin, vinyl resin, amino resin, epoxy resin, phenol resin and the like. The solvent to be used includes an organic solvent and/or water. Examples of the type as the coating composition may include liquid states such as an organic solution, non-aqueous dispersion, aqueous solution, emulsion and the like.

The powdery magnetic material is used in an amount of 1-30 parts by weight, preferably 10-20 parts by weight per 100 parts by weight of the vehicle component as solids.

The patterned film layer (4) has a thickness of 15-35 μm, preferably 20-30 μm. It is not necessary for the surface of the patterned film layer to be completely opacified with the powdery magnetic material.

Process for Forming Patterned Film Layer (4):

A process for forming patterned film layer (4) is explained as follows.

A fluid coating composition containing a powdery magnetic material is coated onto a base sheet layer (3), on which a primer layer (3') has been formed when needed and a pigmented film layer (3'') has been formed when needed and which is in the wet state or has been cured, to form a fluid film.

Under such conditions that the fluid film contains the solvent and the powdery magnetic material is flowable, a magnetic force is acted on the powdery magnetic material contained in the fluid film from behind the base sheet layer (3) or from in front of the fluid film by use of a magnet such as a magnet sheet with the result that the powdery magnetic material moves according to lines of magnetic force, that an orientation of the powdery magnetic material in an area on which the magnetic force has been acted in the fluid film is different from that in other non-orientated area on which the magnetic force has not been acted in the fluid film, and that the orientated area becomes transparent or translucent and may be colored as the case may be, so as to make it possible to see the color tone of the pigmented film layer, etc. through the fluid film. That is, a magnet molded in the form of patterns such as letters, marks and designs is fixed or closely placed in position behind the base sheet layer or in front of the fluid film with the result that the powdery magnetic material dispersed in the fluid film and in the area corresponding to the shape of the magnet, i.e. the shape of the pattern moves as above mentioned to form a pattern (hereinafter referred to simply as a magnetic pattern).

In addition, as an alternative process for forming a patterned film layer, for example, a magnetic force may be acted on the powdery magnetic material in the fluid film from behind the base sheet layer (3) or from in front of the fluid film by use of a magnet sheet which has been neither cut nor molded in the shape of letters, marks, figures, etc. to form a magnetic pattern throughout the laminated sheet. The laminated sheet finally obtained with the pattern may be cut to an intended shape such as letters, marks or designs to be used.

According to the first process for forming the laminated sheet, the shapes of letters, marks and designs are formed in the laminated sheet with the magnetic pattern, whereas according to the second alternative process for forming the laminated sheet, the magnetic pattern is formed throughout the laminated sheet.

According to the above process for forming the laminated sheet, for example, the use of a multi-pole magnet sheet makes it possible to form a magnetic pattern such as a geometrical pattern constituted by lines. Further, changes in the direction thereof make it possible to form line patterns in the crosswise, longitudinal or oblique direction, and superposition thereof in layers for crossing the lines of magnetic force makes it possible to form various magnetic patterns. The use of one-pole magnet sheet makes it possible to form a magnetic pattern in an annular area of the laminated sheet, because it produces magnetism only at an edge of the laminated sheet.

Therefore, at the time when the magnet is fixed or closely placed in position behind the base sheet layer (3) or in front of the fluid film, the powdery magnetic material must have flowability, and specifically when a magnetic force is acted thereon by use of the magnet, the fluid film has a viscosity of 0.5-3 poise, preferably 1-2 poise at 20° C.

The magnet may be fixed or closely placed in position behind the base sheet layer (3) or in front of the fluid film, for example, by a process which comprises fixing or closely placing a magnet behind the base sheet layer (3), followed by forming a fluid film on the front surface of the base sheet layer (3), or by an alternative process which comprises forming a fluid film on the front surface of the base sheet layer (3), followed by fixing or closely placing in position a magnet behind the base sheet layer (3) or in front of the fluid film. The magnet fixed or placed in position as above is removed after the fluid film has been dried to the touch, and may be removed after forming a fluid film, after forming a transparent or translucent layer (4′) to be explained hereinafter, or after forming a pigment print layer (5). However, the formation of the fluid film followed by coating or printing a composition for forming the transparent or translucent layer (4′) under the conditions that a magnet is fixed or placed in position behind the base sheet layer (3), results in that the surface of the fluid film is dissolved in a solvent to be reduced in viscosity, that the powdery magnetic material therein further moves due to magnetism, and that the originally formed magnetic pattern may be changed. Therefore, it is preferred to remove the magnet before forming the transparent or translucent layer (4′).

Pigmented Print Layer (5):

The pigmented print layer (5) is a pigmented print layer which is prepared by forming shapes of letters, figures, marks, etc. by means of printing on the surface of the patterned film layer (4). The formation of the pigmented print layer (5) on the surface of the patterned film layer (4) makes it possible to clearly raise the magnetic pattern in the shape of letters, figures, marks, etc. (see, FIG. 1). The magnetic pattern in the shape of letters, figures, marks, etc. exhibits excellent color feelings according to the control of lighting and angle of incidence.

The pigmented print layer (5) may be formed by use of a powdery or fluid printing ink which contains a coloring matter and vehicle as the major components and, when needed, further contains a printability adjustor, drying adjustor, coloring matter dispersant, printed film physical properties improver, printed film weather resistance improver, etc.

The coloring matter is not specifically limited so long as the print layer is colored, and may arbitrarily be selected according to an intended color feeling from, for example, organic pigments, inorganic pigments, dyes, metal powders such as aluminum powder, pearl-shaped pigments, mica, and special coloring matters such as fluorescent pigments, fluorescent dyes and the like.

The vehicle is used to give the printing ink a suitable viscosity for making printing possible, and to impart adhesive properties with the patterned film layer (4) for preventing the pigmented print layer from being peeled off.

As the vehicle, the conventional ones may be used. Examples thereof include fats and oils, aliphatic acid, alkyd resin, polyester resin, rosin, phenol resin, rubber, polyolefin resin, silicone resin, epoxy resin, urethane resin, fluorocarbon resin, and derivatives or modified products thereof. They may be used alone or in combination.

In addition to forming a non-crosslinked pigmented print layer by use of the vehicle component, the above vehicle may form a crosslinked pigmented print layer by the following processes. Specific examples thereof include a process for preparing a crosslinked print layer, which comprises keeping at room temperature or heating a printing ink obtained by incorporating a drier such as metal naphthenate and the like into a vehicle component selected from drying oil, semidrying oil, drying oil aliphatic acid, semidrying oil aliphatic acid, alkyd resin prepared therefrom or the like; a process for preparing a crosslinked print layer, which comprises keeping at room temperature or heating a printing ink obtained by incorporating, when needed, a catalyst comprising an organic metal compound such as a metal chelate compound or the like into a vehicle component selected from acrylic resin, silicone resin, polyester resin and the like, all having silanol group, hydrolyzable group bonded directly to silicon atom; i.e. alkoxysilane group, acetoxysilane group, etc., and the like; a process for preparing a crosslinked print layer, which comprises keeping at room temperature or heating a printing ink obtained by incorporating a crosslinking agent such as amino resin, polyisocyanate compound, blocked polyisocyanate compound or the like into a vehicle component selected from acrylic resin, epoxy resin, alkyd resin, polyester resin, fluorocarbon resin, urethane resin and the like, all having hydroxyl group, etc.; and a process for preparing a crosslinked print film, which comprises irradiating an active radiation onto a printing ink obtained by incorporating, when needed, a photopolymerization initiator, polymerizable unsaturated monomer and the like into a vehicle component selected from acrylic resin, polyester resin, urethane resin, epoxy resin, silicone resin, fluorocarbon resin and the like, all having a double bond polymerizable through an active radiation.

In the case where the printing ink is used in a fluid state, the vehicle component, for example, may be dissolved or dispersed in water or an organic solvent having a boiling point ranging from low to high for using.

Process for forming pigmented print layer (5):

The pigmented print layer (5) may be formed by a process which comprises printing a printing ink onto the patterned film layer (4) by means of screen printing, gravure printing, offset printing, flexographic printing, etc., followed by drying by means of air-drying, baking, irradiation of active radiation, etc. Prior to printing, the surface of the patterned film layer (4) may be dried to such an extent that the printing of the printing ink causes no changes in the shape thereof.

A transparent or translucent layer (4′), which may be colored unless the magnetic pattern disappears, may be formed on the surface of the patterned film layer (4) when needed. In the case where the printing ink is printed on the layer (4′), the layer (4′) may be dried to such an extent that the shape of printing does not get out of shape as in the surface of the patterned film layer (4). The transparent or translucent layer (4′) may be formed by use of one obtained by removing the coloring matter from the above printing ink, the same one as the above printing ink except that the coloring matter is contained to such an extent as to form a translucent layer, and the like. The transparent or translucent layer (4′) has such advantages as to make it possible to make the surface of the patterned film layer (4) smooth and improve printability with the printing ink and to clearly draw the shapes of letters, figures, marks, etc. The transparent or translucent layer (4′) may be formed by coating by means of screen printing, brushing, flow-coating, roller coating, spray coating, etc. to a dry film thickness of normally 1–1000 μm, preferably 5–50 μm.

Figure 9:
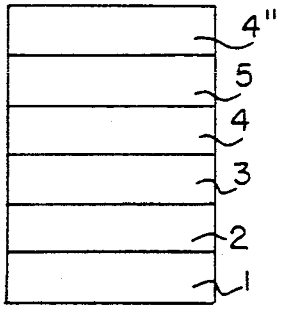
Figure 10:
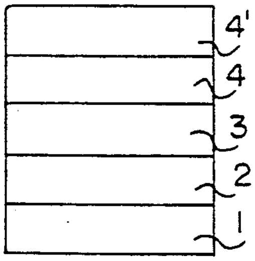

A transparent or translucent layer (4″) may be formed on the surface of the pigmented print layer (5) when needed (see, FIG. 9). The transparent or translucent layer (4″) may be formed by coating the same one used for forming the transparent or translucent layer (4′) by the same coating means as in the layer (4′). The dry film thickness thereof may be 1–1000 μm, preferably 5–50 μm.

Figure 3:
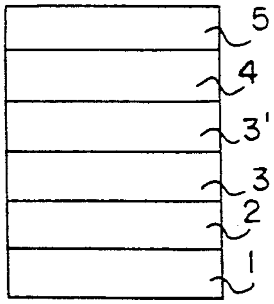
Figure 5:
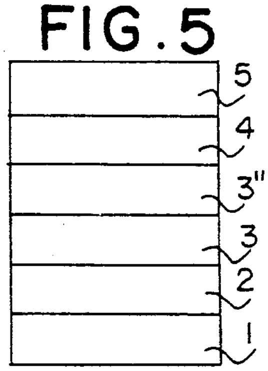
Figure 7:
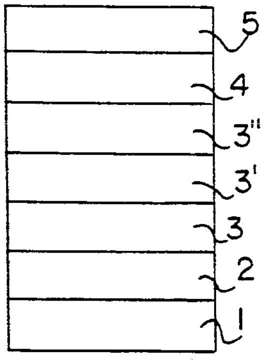

Preferably, the laminated sheet of the present invention is firstly prepared by successively laminating a release sheet layer (1), a pressure-sensitive adhesive layer (2), a base sheet layer (3), a primer layer, (3′) when needed (see, FIG. 3), a pigmented film layer (3″) (see, FIG. 6) when needed, a patterned film layer (4) and a transparent or translucent layer (4′) when needed. Preferably, the laminated sheet of the present invention is secondly prepared by successively laminating a release sheet layer (1), a pressure-sensitive adhesive layer (2), a base sheet layer (3), a primer layer (3′) when needed (see, FIG. 7), a pigmented film layer (3″) when needed (see, FIG. 5), a patterned film layer (4), a transparent or translucent layer (4′) when needed, a pigmented print layer (5) and a transparent or translucent layer (4″).

The patterned film forming laminated sheet of the present invention may be applied to an object by peeling the release sheet layer (1) from the pressure-sensitive adhesive layer (2), followed by sticking the pressure-sensitive adhesive layer (2) to the object so that it may adhered to the object throughout the surface thereof and by being adhered under pressure in the direction of from over the pigmented print layer (5) to the object, or may be applied to the object by cutting in a suitable size and shape prior to peeling the release sheet layer (1) from the pressure-sensitive adhesive layer (2), followed by the same procedures as above.

The patterned film forming laminated sheet of the present invention provides the following technical effects, i.e. (i) a patterned film is easily formed on curved concave surfaces in which coating by spraying, etc. is difficult; (ii) coating operations become unnecessary, resulting in saving labors and time; (iii) no coating composition is used on its application, resulting in greatly improving safety and sanitary conditions, working environment, etc.; (iv) the patterned film layer has no roughness due to the pattern and has excellent smoothness, resulting in improving appearance of the final laminated sheet without showing any adhesion of dusts thereto; and (v) the pigmented print layer makes it possible to easily draw shapes of letters, marks, designs, etc., resulting in increasing productivity and in reducing product costs.

EXAMPLE

The present invention is explained more in detail by the following Examples, in which "part" and "%" mean "part by weight" and "% by weight" respectively.

An adhesive containing poly-2-ethylhexyl acrylate as the major component and having a Tg of −50° C. is coated on one side of a plasticized polyvinyl chloride resin base sheet layer (3) to form a pressure-sensitive adhesive layer (2). Thereafter, a release sheet layer (1) formed by impregnating a paper with silicone resin and having a thickness of 200 μm is laminated and adhered onto the surface of the adhesive layer (2). A primer layer (3′) containing ethylcellulose as the major component is then formed on another surface of the base sheet layer (3), followed by coating a two-pack type acrylic urethane coating composition prepared by incorporating stainless flakes having a particle size of 10–30 μm as the powdery magnetic material in an amount of 5 parts by weight per 100 parts by weight of the resin, on the surface of the primer layer (3′) to a thickness of 15–25 μm as solids content. In the state in which the film obtained as above has a viscosity of 1–2 poise at 20° C., a magnet sheet molded in the form of a letter as the intended pattern is fixed on the back side of the base sheet layer (3) with the result that orientation of the magnetic material in the fluid film in an area in which the magnet sheet is fixed becomes different from that in other area to develop a clear pattern and to form a patterned film. Thereafter the patterned film thus formed is cured to obtain a laminated sheet of the present invention. The laminated sheet may be cut to a predetermined size and shape and may be applied to an object after peeling off the release sheet layer, resulting in forming the aforementioned patterned film on the object.

EXAMPLE 2

An adhesive layer (2), a release sheet layer (1) and a primer layer (3') are formed in the same manner as in Example 1 except that a blue base sheet layer (3) is used. Thereafter, a thermosetting acrylic resin non-aqueous dispersion coating composition prepared by incorporating nickel granules having a particle size of 10–30 μm in an amount of 15 parts by weight per 100 parts by weight of the resin, is coated onto the primer layer (3'). In the state in which the film thus formed has a viscosity of 1–2 poise at 20° C., a magnet sheet molded in a shape of a predetermined pattern is placed as closely as possible to the surface of the above film, resulting in forming a pattern due to orientation of nickel granules in an area coinciding with the shape and size of the magnet sheet.

The patterned film forming laminated sheet obtained as above is applied to the surface of a door of an automobile through the pressure-sensitive adhesive layer (2) after peeling off the release sheet layer (1) to form a patterned film thereon.

EXAMPLE 3

A release sheet layer (1), a pressure-sensitive adhesive layer (2), a base sheet layer (3), a primer layer (3') and a film prepared from a two-pack type acrylic urethane coating composition and having a viscosity of 1–2 poise at 20° C. are formed in the same manner as in Example 1. Thereafter, a magnet having a width of 30 cm and a length of 60 cm is fixed all over the back side of the base sheet layer (3) with the result that the magnetic material in the fluid film is subjected to orientation to develop a geometrical pattern constituted by lines, i.e. a line pattern all over the base sheet layer (3). A laminated sheet having the patterned film obtained as above is left to stand at room temperature for 60 minutes for curing the patterned film.

The patterned film forming laminated sheet obtained as above is applied to the surface of a door of an automobile through the pressure-sensitive adhesive layer (2) after peeling off the release sheet layer (1).

EXAMPLE 4

The magnet sheet, which had been fixed on the back side of the base sheet layer (3) in Example 3, is removed from the patterned film forming laminated sheet, followed by printing letters on the cured patterned film layer (4) by use of a black printing ink, i.e. a xylene solution prepared by dispersing a carbon black pigment in a two-pack type acrylic urethane resin, according to the screen printing and by leaving to stand at room temperature for 60 minutes to obtain a patterned film forming laminated sheet.

The patterned film forming laminated sheet thus obtained is applied to the surface of a door of an automobile through the pressure-sensitive adhesive layer (2) after peeling off the release sheet layer (1) to form a patterned film thereon.

Examples 1–4 provide a patterned film forming laminated sheet which capable of showing changes in the magnetic pattern due to the angle of incidence, colorful feelings due to control of lighting and perspective feelings or stereographic feelings.

What is claimed is:

1. A patterned film-forming laminated sheet comprising a multilayer construction prepared by successively laminating a release sheet layer, a pressure-sensitive adhesive layer, a base sheet layer, a patterned film layer and a pigmented print layer, said patterned film layer being prepared by a process which comprises coating a fluid coating composition containing a powdery magnetic material comprising at least one selected from a group consisting of nickel, stainless steel having a high content of iron, iron and cobalt, on one side of the base sheet layer to form a fluid film, and acting a magnetic force on the powdery magnetic material contained in the fluid film in such a fluid state that the fluid film has a viscosity of 0.5–3 poise at 20° C. to form a pattern.

2. A patterned film-forming laminated sheet as claimed in claim 1, wherein a prime layer is formed between the base sheet layer and the patterned film layer.

3. A patterned film-forming laminated sheet as claimed in claim 1, wherein a pigmented film layer is formed between the base sheet layer and the patterned film layer.

4. A patterned film-forming laminated sheet as claimed in claim 2, wherein a pigmented film layer is formed between the primer layer and the patterned film layer.

5. A patterned film-forming laminated sheet as claimed in claim 1, wherein a transparent or translucent layer is formed on the surface of the pigmented print layer.

6. A patterned film-forming laminated sheet as claimed in claim 1, wherein the powdery magnetic material is in the shape of a flake having a particle size of 1–150 μm.

7. A patterned film-forming laminated sheet as claimed in claim 1, wherein the magnetic force is acted on the powdery magnetic material from behind the base sheet layer or from in front of the fluid film by use of a magnet.

8. A patterned film-forming laminated sheet as claimed in claim 7, wherein the magnet is a magnet sheet and is fixed on the back side of the base sheet layer, said magnet sheet having the same shape as that of the pattern to be formed or a shape to cover the back side of the base sheet layer.

* * * * *